US007665120B2

(12) United States Patent
Ramanathan et al.

(10) Patent No.: US 7,665,120 B2
(45) Date of Patent: *Feb. 16, 2010

(54) VISUAL SUMMARY OF A WEB SERVICE POLICY DOCUMENT

(75) Inventors: Govindaraj Ramanathan, Redmond, WA (US); Hervey O. Wilson, Bellevue, WA (US); Keith W. Ballinger, North Bend, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

This patent is subject to a terminal disclaimer.

(21) Appl. No.: 11/055,435

(22) Filed: Feb. 10, 2005

(65) Prior Publication Data
US 2006/0075466 A1 Apr. 6, 2006

Related U.S. Application Data

(63) Continuation of application No. 10/959,886, filed on Oct. 5, 2004.

(51) Int. Cl.
*G06F 17/00* (2006.01)
*G06F 21/00* (2006.01)
*G06F 15/16* (2006.01)
(52) U.S. Cl. .................. 726/1; 713/182; 709/218; 709/229
(58) Field of Classification Search .............. 726/1, 726/3; 713/182; 715/500, 700; 705/50; 717/100, 105; 709/218, 229
See application file for complete search history.

(56) References Cited

U.S. PATENT DOCUMENTS

| 6,484,261 | B1* | 11/2002 | Wiegel ..................... 726/11 |
|---|---|---|---|
| 7,055,142 | B2 | 5/2006 | Meredith |
| 7,062,649 | B2 | 6/2006 | Daniell |
| 7,117,487 | B2 | 10/2006 | Meredith |
| 7,178,163 | B2 | 2/2007 | Reeves |
| 7,216,335 | B2 | 5/2007 | Meredith |
| 2001/0023486 | A1 | 9/2001 | Kayashima |
| 2002/0095592 | A1* | 7/2002 | Daniell et al. ............... 713/200 |
| 2002/0111946 | A1 | 8/2002 | Fallon |
| 2003/0014644 | A1 | 1/2003 | Burns |

(Continued)

OTHER PUBLICATIONS

Bahler, L., et al., "Experience with a Model-Driven Approach for Enterprise-Wide Interface Specification and XML Schema Generation," Proceedings, Seventh IEEE International Enterprise Distributed Object Computing Conference, Sep. 2003, pp. 288-295.

(Continued)

*Primary Examiner*—Minh Dieu Nguyen
(74) *Attorney, Agent, or Firm*—Workman Nydegger (57) ABSTRACT

Example embodiments provide for a rule-based wizard type tool for generating secure policy documents. Wizard pages present a user with general Web Service security options or questions at a user interface, which abstracts the user from any specific code, e.g., XML code, used for creating a Web Service policy document. Based on user input selecting general criteria, security rules are accessed and evaluated for automatically making choices on behalf of the user for creating a secure policy document. Other embodiments also provide for presenting the user with an easily understandable visual representation of selected criteria of a policy document in, e.g., a tree like structure that shows relationships between various elements of the criteria.

12 Claims, 7 Drawing Sheets

U.S. PATENT DOCUMENTS

| | | | |
|---|---|---|---|
| 2003/0061365 A1 | 3/2003 | White | |
| 2003/0065942 A1* | 4/2003 | Lineman et al. | 713/201 |
| 2003/0097574 A1 | 5/2003 | Upton | |
| 2003/0141411 A1 | 7/2003 | Pandya | |
| 2004/0006715 A1 | 1/2004 | Skrepetos | |
| 2004/0034770 A1 | 2/2004 | Kaler | |
| 2004/0060002 A1 | 3/2004 | Lucovsky | |
| 2004/0167984 A1 | 8/2004 | Herrmann | |
| 2004/0225656 A1 | 11/2004 | Sarkar | |
| 2005/0044197 A1 | 2/2005 | Lai | |
| 2005/0081039 A1 | 4/2005 | Lee | |
| 2005/0086197 A1* | 4/2005 | Boubez et al. | 707/1 |
| 2005/0097440 A1 | 5/2005 | Lusk | |
| 2005/0210235 A1 | 9/2005 | Best | |
| 2005/0235360 A1 | 10/2005 | Pearson | |
| 2006/0195844 A1 | 8/2006 | Jalobeanu | |
| 2007/0124797 A1 | 5/2007 | Gupta | |

OTHER PUBLICATIONS

Bocchi, L.,"A perspectice on Multiagent Coordination Models," Communication in Multiagent Systems, vol. 2650, 2003, pp. 146-163.

Dae-Sung Yoo, et al., "A Framework for Automatic Generation of Instrument Control and Monitoring Software," Proceedings KORUS 2003; 7th Korea-Russian International Symposium on Science and Technology, vol. 2, Jun. 2003, pp. 428-432.

Jin Song Dong, et al., "XML-Based Static Type Checking and Dynamic Visualization for TCOZ," Formal Methods and Software Engineering; 4th International Conference on Formal Engineering Methods, ICFEM 2002, Oct. 2002, pp. 311-322.

Office Action dated Dec. 28, 2007 cited in U.S. Appl. No. 10/959,886.

Office Action dated Aug. 14, 2008 cited in U.S. Appl. No. 10/959,886.

* cited by examiner

VISUAL SUMMARY OF A WEB SERVICE POLICY DOCUMENT

CROSS-REFERENCE TO RELATED APPLICATIONS

This is a continuation of U.S. patent application Ser. No. 10/959,886, filed on Oct. 5, 2004.

BACKGROUND OF THE INVENTION

1. The Field of the Invention

The present invention generally relates to Web Service policies. More particularly, the present invention provides for a rule-based tool that assists a user in generating a secure policy document by automatically selecting security conditions for the user's general security criteria. Further, the present invention provides for a wizard type tool that presents the user with an easily understandable visual representation summarizing selected criteria of a Web Service policy document.

2. Background and Related Art

Computer systems and related technology affect many aspects of society. In deed, the computers system ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web Services has been a driving force in advancing such communications between systems and is turning the way we build and use software inside-out.

Web Services let applications share data, and—more powerfully—invoke capabilities from other applications without regard to how those applications were built, what operating system or platform they run on, and what devices are used to access them. Web Services are invoked over the Internet by means of industry-standard protocols including SOAP (Simple Open Access Protocol), XML (eXtensible Markup Language), UDDI (Universal Description Discovery Integration), WSDL (Web Service Description Language), etc. Although Web Services remain independent of each other, they can loosely link themselves into a collaborating group that performs a particular task.

Often, electronic communication on a Web Service network includes a client computer system (hereafter referred to as a "client") requesting access to a network service (e.g., Web Services) at a server computer system (hereinafter referred to as a "service"). Accordingly, the client sends a request to the service for particular access to its system resources, wherein if the client is authorized and validated the service responds with a response message providing the desired information. Of course, this request/response type communication is governed by various requirements and capabilities defined by both the client and the service called Web Service Policies, wherein each must be conformant to the others policies.

Web Service policies define a framework and a model for expression of those properties as policies. Policy expressions allow for both simple and declarative assertions as well as more sophisticated conditional assertions. Further, some assertions specify traditional requirements and capabilities that will ultimately manifest on the wire (e.g., authentications scheme, transport protocol selection). Other assertions specify requirements and capabilities that have no wire manifestation yet are critical to proper service selection and usage (e.g., privacy policy, Quality of Service (QoS) characteristics). Nevertheless, Web Service policies provide a single policy grammar to allow both kinds of assertions to be reasoned about in a consistent manner. Typical, Web Service policies define an XML data structure called policy expression which contains domain specific Web Service policy information and a core set of grammar elements to indicate how the contained policy assertions apply. The policy document can be applied to any Web Service or client to secure a Web Service communication.

A key benefit of the emerging Web Service architecture is the ability to deliver integrated, interoperable solutions. Because, however, Web Services provide various services from different business, organizations, and other service providers via the Internet, security issues are a main concern to protect information that is transferred. Accordingly, Web Services protocols have established security standards that describe enhancement to messaging protocols (e.g., SOAP messaging) to provide quality of protection through message integrity, message confidentiality, and single message authentication. For instance, there are mechanisms that can be used to accommodate a wide variety of security models and encryption technologies. Some Web Service security protocols provide a general-purpose mechanism for associating security tokens with messages. Other Web services securities describe how to encode binary security tokens. Specifically, one specification describes how to encode X.509 certificates and Kerberos tickets as well as how to include opaque encrypted keys. This particular service also includes extensibility mechanisms that can be used to further describe the characteristics of the credentials that are included within a message.

By themselves, Web Services securities do not insure security nor do they provide a complete security solution. Web Service securities are building blocks that are used in conjunction with other Web Services in application-specific protocols to accommodate a wide variety of security models and encryption technologies. For example, Web Service securities are used in conjunction with Web Service policies for providing a flexible and extensible grammar for expressing capabilities, requirements, and general characteristics of entities in a Web Service-based system.

Defining a secure policy document using the Web Service policies specification is a challenge for even the most experienced Web Service developers. Omitting a specific requirement or capability can result in serious security vulnerability in the system. This results in severe usability issues when trying to use Web Service policies. Moreover, because the extreme extensibility of XML typically used in Web Service policy documents, developers don't always understand exactly what tags they need to put in secure a service. As such, they typically insecure policies, which are susceptible to attack or other malicious use. Further, because the Web Service policy documents are coded XML, there is no quick and easy way to view the properties of the policy document without having to parse through the XML code. Accordingly, those with a limited knowledge of the WS-Policy schema may not be able to fully appreciate or understand the criteria set forth in a policy document.

Accordingly, there exists a need for a tool that can abstract the user from code used to satisfy Web Service policy documents. Moreover, the tool should be driven by rules in order to insure, e.g., optimum security. In addition, the tool should be able to give an easily understandable visual representation summarizing the criteria of the XML based Web Service policy document.

BRIEF SUMMARY OF THE INVENTION

The above-identified deficiencies and drawbacks of current Web Service infrastructures are overcome by the present invention. For example, at a computer system in a Web Services environment, the present invention provides for assisting a user in generating a more secure policy document by providing a rule-based tool that automatically selects security conditions for the user's general security criteria such that the user does not have exposure to all the security details. Further, the present invention provides for a wizard type tool configured to present a user with an easily understandable visual representation summarizing selected criteria for a Web Service policy document.

Example embodiments provide for presenting a set of Web Service security options to a user at a user interface, which abstracts the user from any specific code that will be generated for a secure policy document that satisfies the set of Web Service security options. User input is received that selects a general security criterion from the set of Web Service security options presented. Based on the received user input, one or more security rules are accessed from a repository of extensible security metadata. The security rule(s) corresponding to the general security criterion are then used to generate the secure policy document in accordance with the general security criteria.

Other example embodiments provide for presenting a set of Web Service policy options to a user at a user interface, which abstracts the user from any specific code that will be generated for policy documents and satisfies a set of Web Service policy options. User input is received for selecting desired criteria from the set of Web Service policy options. Based on the received user input, a graphical model including key words or symbols representing the desired criteria is generated. The graphical model is then presented to the user at the user interface for providing a visual recap of the policy document.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for assisting a user in generating a secure policy document and providing an easily understandable visual summary of the policy document. The embodiments of the present invention may comprise a special purpose or general-purpose computer including various computer hardware, as discussed in greater detail below.

Example embodiments of the present invention provide for a rule-based interactive utility tool (e.g., a wizard) that guides a user through a series of steps in order to create a secure Web Service policy. Such tool or wizard consists of multiple wizard pages that a user progresses through by clicking on the next or back buttons. While shielding the user from any particular code for creating such Web Service policies, each page of the wizard provides some information to the user to guide them through a subset of tasks necessary to complete a Web Service security policy document. As one would appreciate, wizards are commonly used within a graphical user interface (herein after "GUI") operating systems and by hundreds of applications that run in these operating systems. Within the GUI, other example embodiments provide for an easily understandable visual representation summarizing selected criteria for a Web Service policy document generated using the wizard tool.

Figure 1:
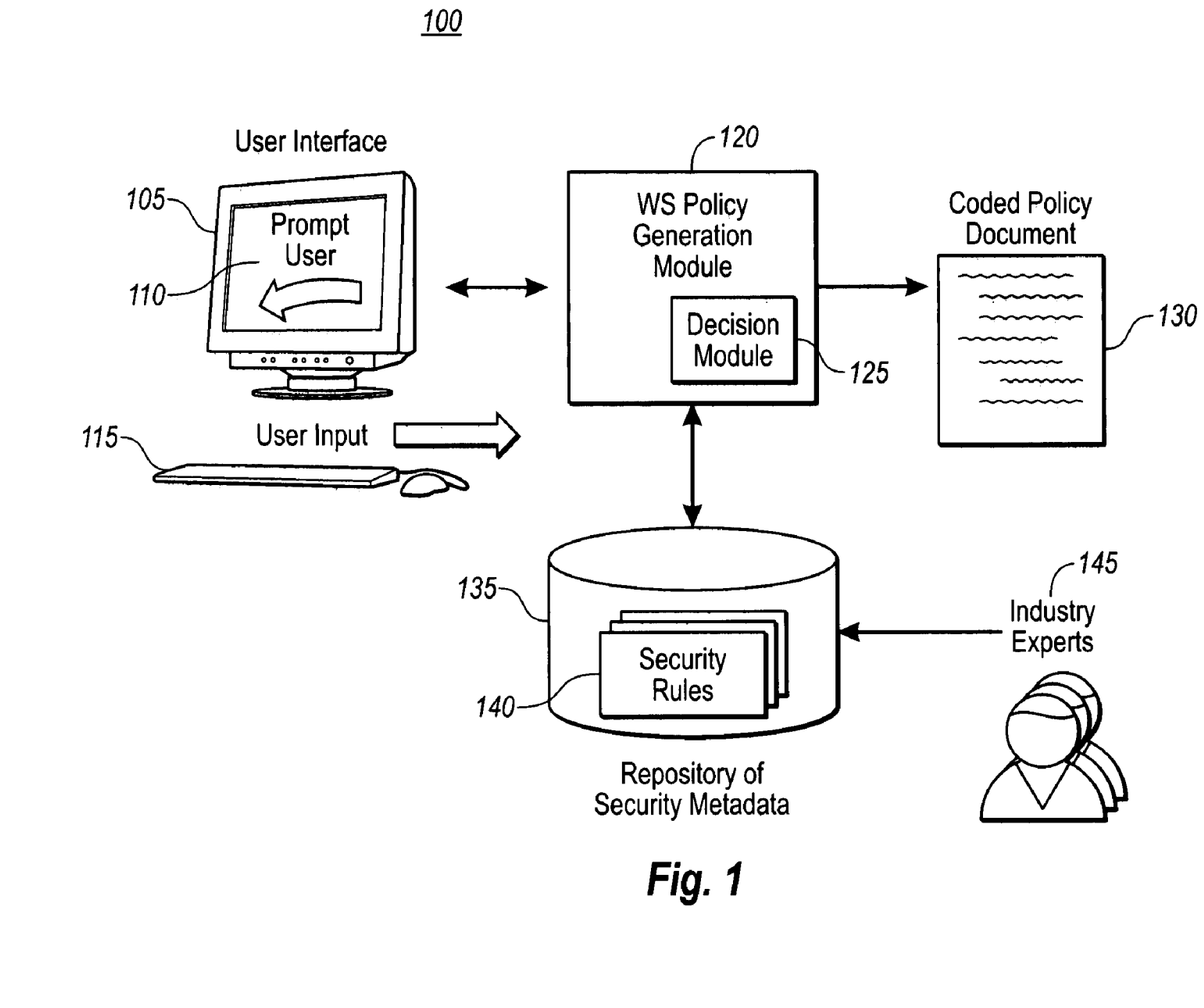
FIG. 1 illustrates a computer system for generating Web Service security policy documents in accordance with example embodiments of the present invention.

FIG. 1 illustrates various aspects of some of the above-described example embodiments. As shown in the distributed system 100, a Web Service policy generation module 120 is provided for prompting a user 110 through, for example, a wizard page at a user interface 105. The Web Service (WS) policy generation module 120 can prompt user 110 through a series of options or questions, yet abstract the user from any specific code used for generating a secure policy document that satisfies a set of Web Service security options. Based on user input 115 that selects general security criteria from the options presented, a decision module 125 can access security rules 140 within a repository of extensible security metadata 135 that correspond to the general security criteria.

Using the security rules 140, decision module 125 can make a subset of choices on behalf of the user, which typically are abstracted from the user. For example, the decision module 125 may use the security rules 140 in determining that specific options should not be presented in subsequent wizard page(s) in order to prevent a user from selecting invalid objects that potentially would make the Web Service security policy invalid. Further, as discussed in greater detail below, decision module 125 can use the security rules 140 for creating a secure coded policy document 130 based on wisdom from industry experts. Of course, as described in greater detail below, decision module 125 can make a plurality of choices based on the security rules 140 and the user input 115. Accordingly, the above identified examples—and any subsequence specific examples—of choices made on behalf of a user based on the security rules 140 are used for illustrative purposes only and are not meant to limit or otherwise narrow the scope of the present invention unless explicitly claimed.

As one would appreciate, the security rules 140 may be based or created on a myriad of factors. For example, Web Service policies are defined to be extensible; and therefore, there are multiple ways to define the same policy. Accordingly, security rules 140 could be used by decision module 125 for generating a potentially optimal layout for the coded policy document 130. Further, a user might not understand the best approach for defining a particular capability from the general security criteria chosen through the user input 115. For instance, the user might want to use a Kerberos token to sign her request messages, but not fully appreciate or understand that a derived key token of the Kerberos token is the optimal approach. Accordingly, as mentioned above, the security rules 140 may be based on wisdom from industry experts 145 who can provide input in defining the rules that the decision module 125 can use in creating a potentially optimal secured coded policy document 130, based of course on the choices made by the user.

Of course the security rules 140 may be based on other factors besides wisdom from industry experts 145. For example, as discussed above, security rules 140 can be used to generate correct policy documents. Theoretically one can create a policy document with specific capabilities that are fully conformant with the Web Service policy specification; however, some capabilities do not make sense or are not strong enough policies. Accordingly, based on the options the user has chosen, security rules 140 can be used to remove all policy options that are invalid. Of course, the security rules 140 can be based on other industry standards and or can be used to create valid policy files that obey, e.g., governmental policies or other organizational policies. As such, the security rules 140 should be broadly construed to include a numerous set of actions or choices made by decision module 125 and should also be broadly construed to include any number of factors for how the security rules 140 are generated.

Other example embodiments provide that at least some of the general user criteria and some of the security rules 140 are stored in memory as data structures that include policy objects. This has the added advantage of allowing a user to easily change general security criteria without continually having to write and rewrite a coded policy document 134 when such changes occur. For example, if the user wishes to sign requests with a Username token, but later decides to sign with Kerberos, the Username token object is simply replaced with a Kerberos token object. Similarly, any security rule 140 objects that apply to the Username token can be replaced with corresponding security rule 140 objects for the Kerberos token. Upon receiving user input 115 to generate a secure policy document 130, the data structures can be translated from policy objects to coded language for the secure policy document 130.

Figure 2:
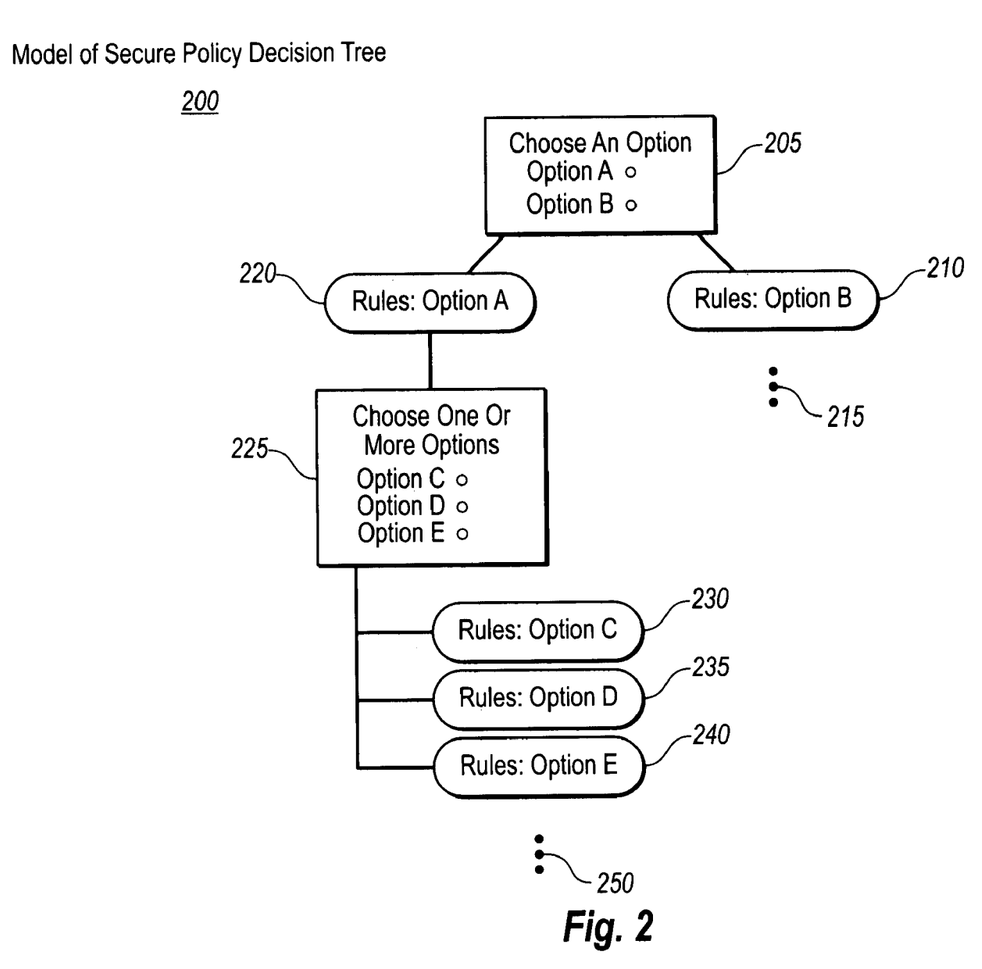
FIG. 2 illustrates a model of a secure policy decision tree in accordance with example embodiments of the present invention.

One way to described example embodiments of the present invention is through the visual representation of a decision tree. FIG. 2 illustrates a general model of a secure policy decision 200 wherein the user is presented with various options and based on those options rules can then be applied and used for subsequently generating a secure policy document. For example, as shown, user may be presented with options in user interface 205 of option A and option B. Based on the user input, the rules 220 for option A or the rules 210 for option B may apply. For example, if the user choices option A, then the rules 220 for option A will apply. As mentioned above, the rules may be based on a myriad of factors, e.g., government policies in order to assist the user in creating a governmental conformant policy document. Further, the rules may be based on Web Services policies to assist a user in creating a policy document that conforms to the Web Services policy. Moreover, the rules 220 for option A may be used to generate a next set of options shown in user interface 225 as option C, D and E. Based on user input received, rules 230, 235, 240 for options C, D and E may apply.

Of course, as represented by the vertical ellipses 250 and 215, any number of rules and/or options may apply to the model of secure policy decision tree 200. Further, as described in greater detail below, the rules may be based on whether a client or a service policy document is being generated. Moreover security rules may be optional wherein the user can choose from or decide whether the optional rules should apply. Further, the rules may be default values that can be overridden by the user. Of course, as previously mentioned, the rules may be any well known form or based on any number of other factors; and therefore, any specific type of rule or bases thereof as described herein are used herein for illustrative purposes only and are not meant to limit or otherwise narrow the scope of the present invention unless explicitly claimed.

Figure 3:
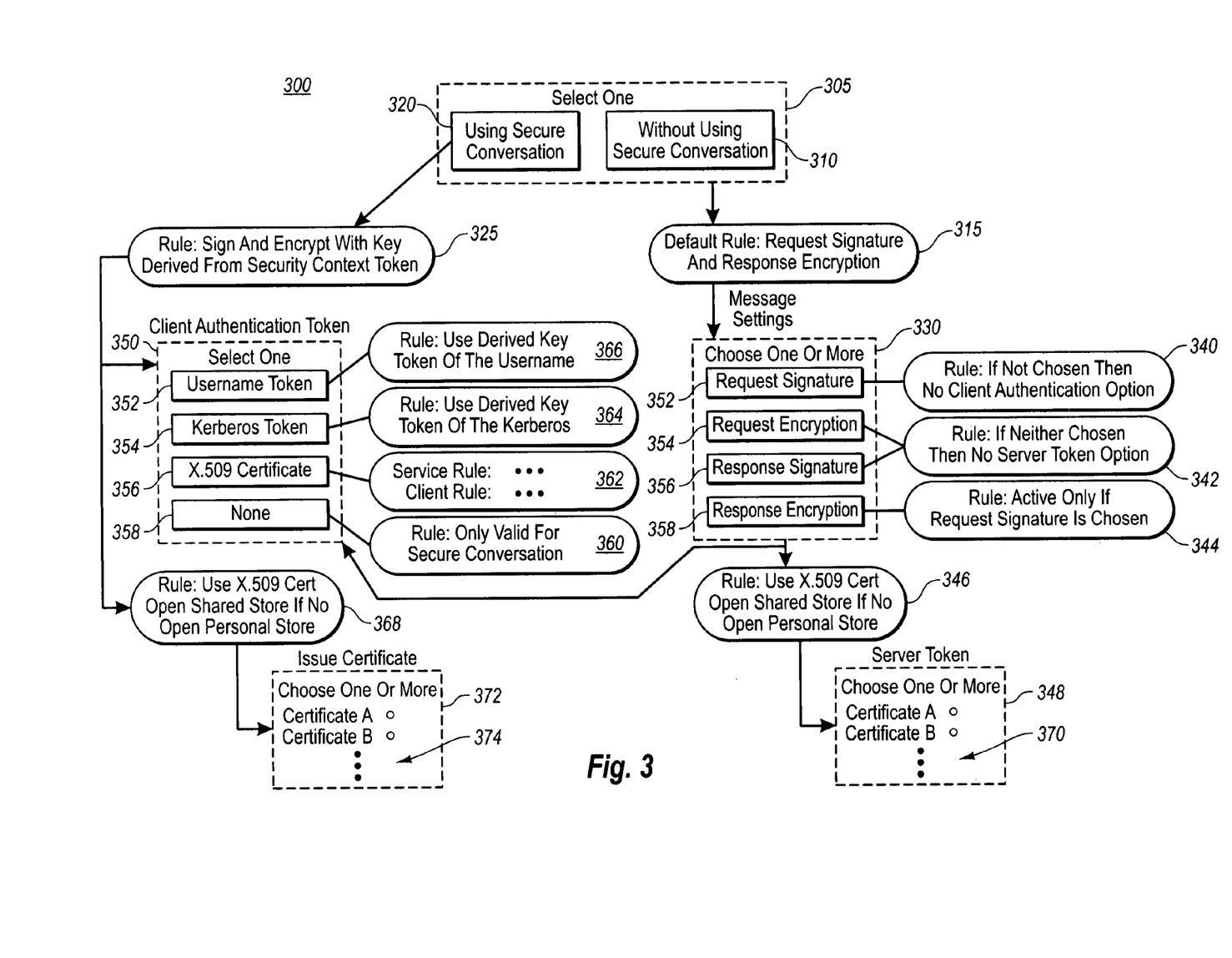
FIG. 3 illustrates an example service/client policy decision tree in accordance with example embodiments of the present invention.

FIG. 3 illustrates a more specific use of various rules and choices for a service/client policy decision tree 300. For example, as shown, the user may be presented with a selection 305 for choosing either a fully secured conversation 320 or a partially secured conversation 305. Assuming the user selects using secure conversation 320, rule 325 applies requiring that request and response messages be signed and encrypted with a key derived from the security context token. Based on rule 325, the client authentication tokens 350 selection is presented to the user prompting the user to select a general security criterion. For example, the user may be presented with the options to select one of a Username token 352, Kerberos token 354, X.509 certificate 356, or no client authentication token as indicated by None option 358. Based on the user input, particular rules corresponding to the selected criterion apply. For example, if the Username token 352 is selected by the user, then rule 366 applies such that a derived key token of the Username token is assumed, since the derived key token of a Username token is more secure than a normal Username token. Further, an optional rule (not shown) of entering a subject and role name for the Username token 352 may apply.

If, on the other hand, the user selects a Kerberos token 354, then rule 364 applies for using a derived key token of the Kerberos token, since similar to the Username token, the derived key token of the Kerberos token is more secure than a normal Kerberos token. As an example of security rule 140 based on whether a service or client policy is being created, the user may be prompted to enter a service name, wherein an additional rule (not shown) requires that if a service policy is being created, a default value may apply to the machine name where the policy wizard is run. On the other hand, if the client policy is being generated the field is empty and the user specifies the machine from where to request the Kerberos token. Further, an optional rule (not shown) for entering the subject and roll name for the Kerberos token may apply.

If the user selects the X.509 certificate 356 from the client authentication token selection 350, then various rules 362 may apply depending upon whether a service or a client policy document is being generated. As for the server certificate when a service policy is being created, a rule applies such that no option to choose multiple certificates is allowed, since each service will only have one certificate that represents it. Further, a rule of opening just the local machine store that is personal to the server applies. When a client policy is being created, on the other hand, a client certificate rule applies, similar to the server certificate rule, wherein each client will only have one certificate that represents them; and therefore, the user is not allowed to select multiple certificates. Further, when trying to select a certificate, a choice is made on the user's behalf to open the current user store that is personal to the client.

Next, for the client authentication token selection 350, rule 360 applies to the None option 358. Rule 360 specifies that the None option 358 is valid only when using secure conversation. Accordingly, as described below, when without using secure conversation 305 is chosen the None option 358 will not be presented to the user, since this would be an invalid option. Nevertheless, the None option 358 enables clients who are using secure socket layer (SSL) to authenticate themselves.

Assuming the user has chosen the full security conversation 320, the user will be presented with an issue certificate selection 372 with various certificates 374 presented therein for selection. The issue certificate has a rule 368 that specifies that a X.509 certificate is used for the security context token issuer in signing the response. When generating a client policy, a shared current user store accessible by other people is opened to choose certificates. If this store does not exists or if the store does not have any certifications then a current user store that is personal to the client is opened. Similarly, when generating a service policy, a shared local machine store accessible by other people is opened first for selecting certificates. If this store is empty or if the store does not exist, then a local machine store personal to the client is opened.

Rather than choosing using secure conversation 320 within selection 305, a user may wish to have more control over various options and choose without using secure conversation 310. In such instance, a default rule 315 applies to the message settings section 330 such that a request signature and response encryption is automatically assumed for the user. Because this is a default rule, the user can override this and choose from the various selections shown in message setting selection 330. Accordingly, the user is presented with the options for request signature 352, request encryption 354, response signature 356, and response encryption 358 for the exchange between the client and service.

Rule 340 applies to the request signature option 352 such that if this option is not chosen by the user then the client authentication option or selection 350 will not be presented to the user. Similarly, rule 342 applies to the request encryption 354 and response signature 356 options such that if neither option is chosen then no server token option 348 (as described below) is presented to the user. Finally, rule 344 applies to the response encryption 358 option within the message settings 330, indicating that this option is only active if request signature 352 option is chosen.

Based on the options selected in message setting 330, the client authentication token selection 350 may be presented to the user. As mentioned above, if rule 340 applies because request signature 352 has not been chosen, then the client authentication token selection 350 will not be presented to the user. Further, as described above, the None option 358 will not be given in this without using secure conversation 310 environment, since rule 360 applies. Otherwise, if the client authentication token 350 is available to the user, then the same rules 366, 364, 362 described above for the Username token 350, Kerberos token 354 and X.509 certificate 356 options apply.

As described above, rule 342 for the request encryption 354 and response signature 356 options dictate whether or not the server token option 348 will be presented. If the server token option 348 is given, however, then rule 346 applies for using the X.509 certificate depending on whether a service or client policy document is being generated. For example, if a service policy is being created, a service may trust a number of clients wherein a need arises to specify multiple certificates. In such case, a trusted client certificate rule may apply, wherein when trying to select the certificate the specific module first attempts to open a local machines store shared by other people. If this store is not available, or does not have any certificates, then the local machine store that is personal to the server is opened. Similar to the service, if a client policy is being created, a client may want to communicate with multiple servers; and therefore a need arises to be able to specify multiple X.509 certificates. In such instance, a rule applies that first opens the current user store shared by others. If this store is not available or does not have any certificates, then a current user store that is personal to the client is opened.

Of course there are different stores in a machine wherein X.509 certificate can be stored. Based on wisdom from industry experts 145, however, users don't typically know or understand when to use which stores. Accordingly, the above rules for X.509 certificates specify the appropriate or particular stores for the certificates for efficiency purposes.

Figure 4A:
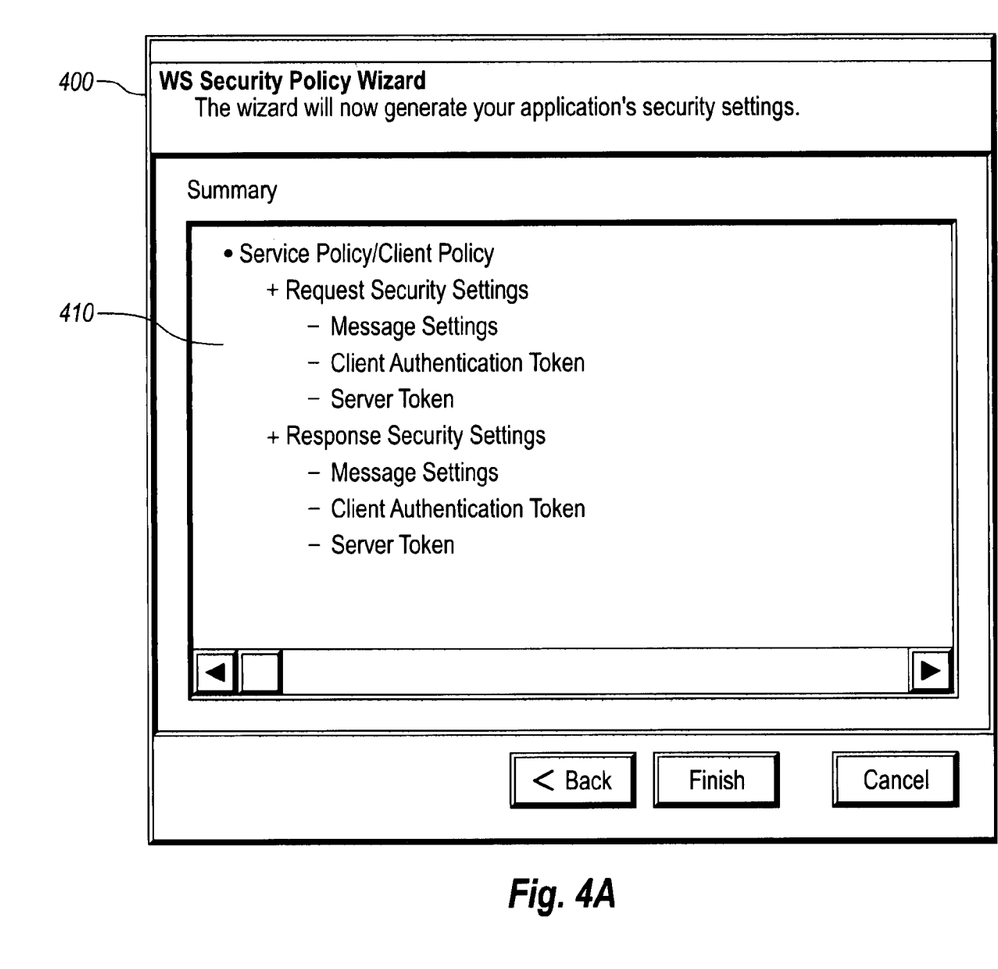
FIG. 4A illustrates an example visual representation of a policy document in accordance with example embodiments of the present invention.

Other example embodiments provide for giving a recap screen, wherein the requirements or criteria selected can be summarized in an easily understandable visual representation. For example, as shown in FIG. 4A, a wizard page 400 may be provided that gives a summary of a service or client policy showing such things as the request security settings and response security settings when without using secure conversation 310 is chosen. Such wizard page 400 abstracts the user from code used to satisfy the policy document created, such that, e.g., no XML code is displayed or seen by the user.

This graphical model on the user interface can include key words or symbols representing one or more of the desired criteria in a bullet or other type fashion. Further, other example embodiments provide that if the user modifies the desired criteria, a new graphical model may be generated. As would be appreciated, the graphical model may be displayed prior to generating the policy document, after generating the policy document, or any time in between, e.g., after each selection of desired criteria in each wizard page. Further, the policy representation may be for a security policy, quality of service policy or other policies. In addition to the criteria presented to the user, security rules that are made on behalf of the client may also be displayed within summary 410.

Figure 4B:
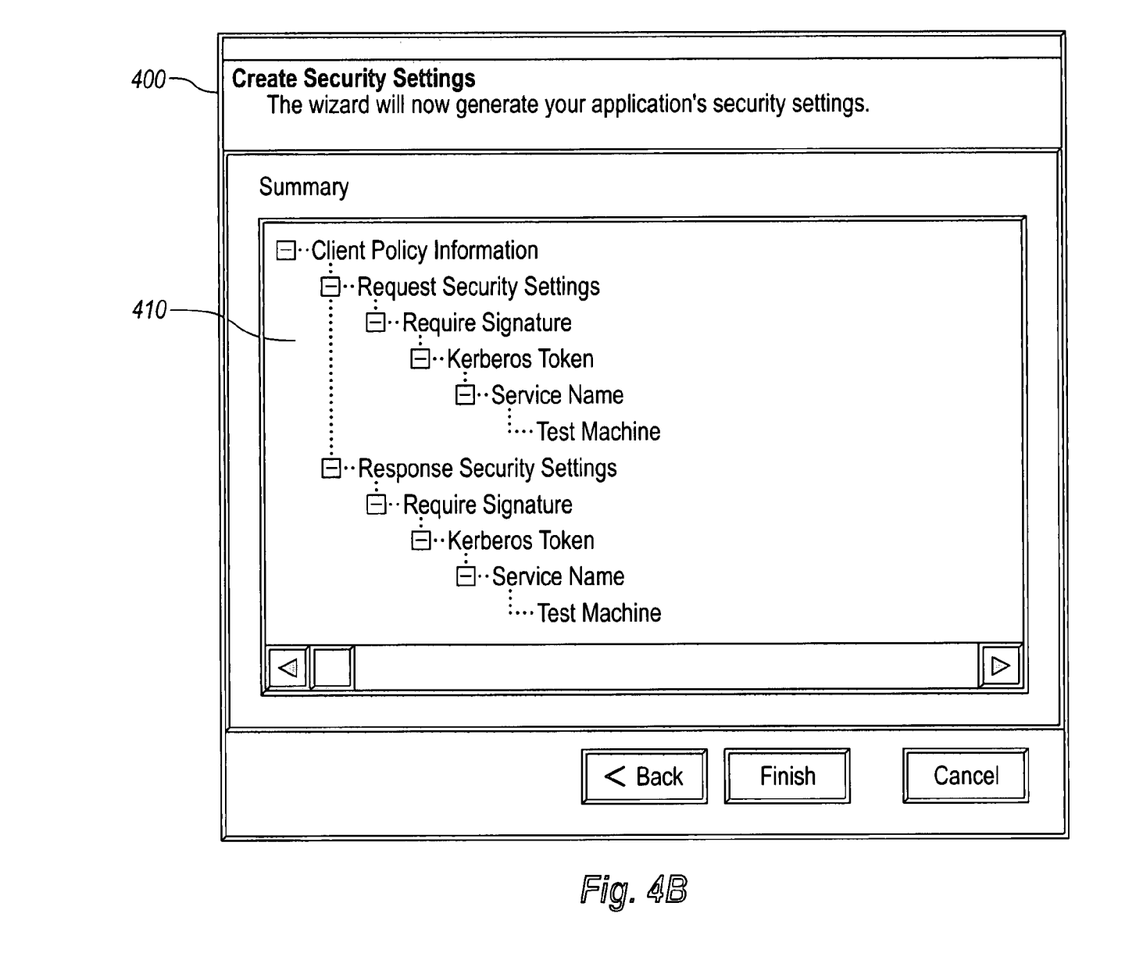
FIG. 4B illustrates an example tree structure visual representation of a policy document in accordance with example embodiments.

Other example embodiments provide for representing a recap screen in a tree like fashion, e.g., as shown in FIG. 4B. In this example, the security settings apply to for a client application, wherein the client is going to sign the request for the Kerberos token and the response should be encrypted with the same token. As shown in the visual representation of the summary 410, client policy information includes both the request security settings and the response security settings. For each of the requests and response security settings, a signature is required and a Kerberos token is used with the appropriate service name, which are tied together with dashed lines, thus creating the tree like model with connecting lines showing the relationship between the various elements of the secure policy document. This tree like structure is collapsible at various stages in order to have a broad overview of the overall policy documents structure. Of course, other visual representations are available to the present invention, and as such, the above recap representations of a tree like structure or a bulleted like structure are used for illustrative purposes only and are not meant to limit or otherwise narrow the scope of the present invention.

The present invention may also be described in terms of methods comprising functional steps and/or non-functional acts. The following is a description of steps and acts that may be performed in practicing the present invention. Usually, functional steps describe the invention in terms of results that are accomplished whereas non-functional acts described more specific actions for achieving a particular result. Although the functional steps and non-functional acts may be described or claimed in a particular order, the present invention is not necessarily limited to any particular ordering or combination of steps and/or acts. Further, the use of steps and/or acts in the recitation of the claims and the following description of the flow charts for FIGS. 5 and 6 are used to indicate the desired specific use of such terms.

Figure 5:
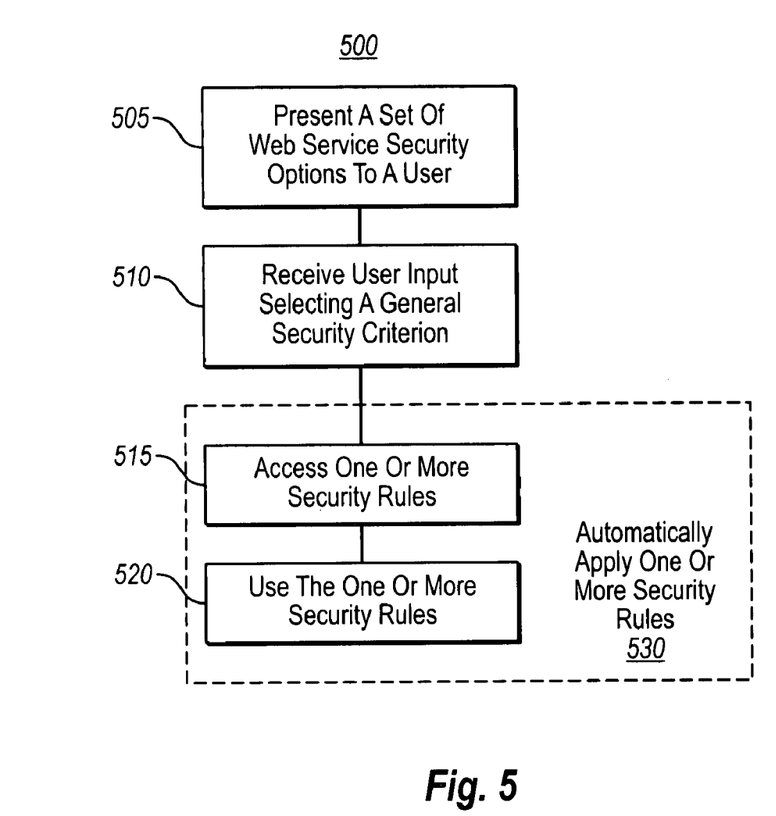
FIG. 5 illustrates a flow chart of a method of assisting a user in generating a secure policy document in accordance with example embodiments of the present invention.
Figure 6:
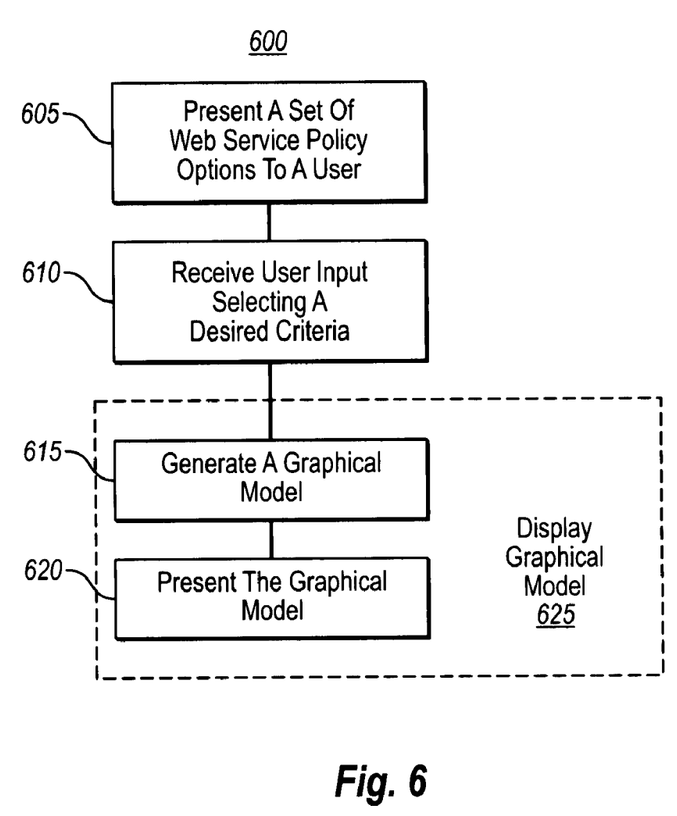
FIG. 6 illustrates a flow chart of a method of presenting a user with an easily understandable visual representation summarizing selected criteria for a Web Service policy in accordance with example embodiments.

FIGS. 5 and 6 illustrate example flow charts for various exemplary embodiments of the present invention. The following description of FIGS. 5 and 6 will occasionally refer to corresponding elements from FIGS. 1A-4B. Although reference may be made to a specific element from these figures, such elements are used for illustrative purposes only and are not meant to limit or otherwise narrow the scope of the present invention unless explicitly claimed.

FIG. 5 illustrates an example flow chart of a method 500 for assisting a user in generating a secure policy document by providing a rule-based tool that automatically selects security conditions for the user's general security criteria such that the user does not have exposure to all of the security details. Method 500 includes an act of presenting 505 a set of Web Service security options to a user. The options are presented at a user interface 105, which abstracts the user from any specific code that will be generated for the secure policy document that satisfies one or more security options. Further, method 500 includes an act of receiving 510 user input selecting a general security criterion. For example, the user could select from using secure conversation 320, without using secure conversation 305 or any of the other various selections or options that can be presented to the user.

Method 500 further includes a step for automatically applying 530 one or more security rules. In particular, step 530 includes an act of accessing 515 one or more security rules. Security rules 140 may be based on Web Service industry wisdom from input given by experts 145 in the industry for potentially optimal security. Further, security rules 140 may be based on government policies for assisting the user in creating a governmental conformance policy document. Moreover, the security rules may be based on Web Service policies to create a policy document that conforms to Web Services policies, or they may be based on any other organization's policies for creating conformant secure policy documents.

Step 530 also includes an act of using 520 the one or more security rules. For example, the security rules 140 maybe used to generate a next set of options to be presented in the wizard tool. In such an example decision module 125 may determine that based on the security rules for user input 115 selecting a particular option that the user should not be presented with a specific option in order to prevent the user from selecting an invalid option. Alternatively, or in conjunction, the security rules 140 may be used by decision module 125 to indicate different options depending upon whether a client or service policy document is being generated. Security rules 140 may or may not be abstracted from the user. Further, the rules 140 may be optional wherein the user can change the security rules 140. The security rules 140 may also be a default value that can be overridden by the user. Moreover, the coded language within the coded policy document 130 that will be generated based on the security rules 140 is typically an XML type document.

Other example embodiments provide that the general security criterion and the one or more security rules 140 are first stored in memory as data structures that include policy objects representing the general security criterion and the security rules 140. In such example embodiment, user input 115 may be received to generate the security policy document, whereupon the data structures are translated from policy objects to coded language, e.g., XML, for generating the secure policy document 130.

FIG. 6 illustrates an example flow chart of a method 600 of presenting a user with an easily understandable visual representation summarizing selected criteria of a Web Service policy document by utilizing a wizard type tool, which that abstracts the user from code used to satisfy the policy document. Method 600 includes an act of presenting a set of Web Service policy options to a user at a user interface. The user interface 105 abstracts the user from any specific code that will be generated for a policy document that satisfies one or more of the set of Web Service policy options. Method 600 also includes an act of receiving 610 user input selecting desired criteria. For example, as shown in the general model of secure policy decision tree 200, the user may be presented with an option 205 to choose option A or option B, or any other available option as previously described. Based on the received user input, method 600 includes a step for displaying 625 a graphical model. Step 625 includes an act of generating 615 a graphical model. The graphical model 410 may include one or more key words or symbols representing the desired criteria. Step 625 also includes an act of presenting 620 the graphical model at the user interface.

Such visual representation provides a visual recap of the policy document. This visual representation of graphical model may be a tree like structure for showing relationships between the desired criteria. Other example embodiments provide that when the user modifies the desired criteria, a new graphical model may be generated. This graphical model may also be a tree like structure similar to the one shown in FIG. 4B. Further, this graphical model may be presented to the user prior to generating the policy document, upon creating the policy document, and/or at each page after selecting the plurality of desired criteria. The graphical model may also include a visual representation of one or more security rules 140 that are automatically selected based on the user's selection of the desired criteria.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
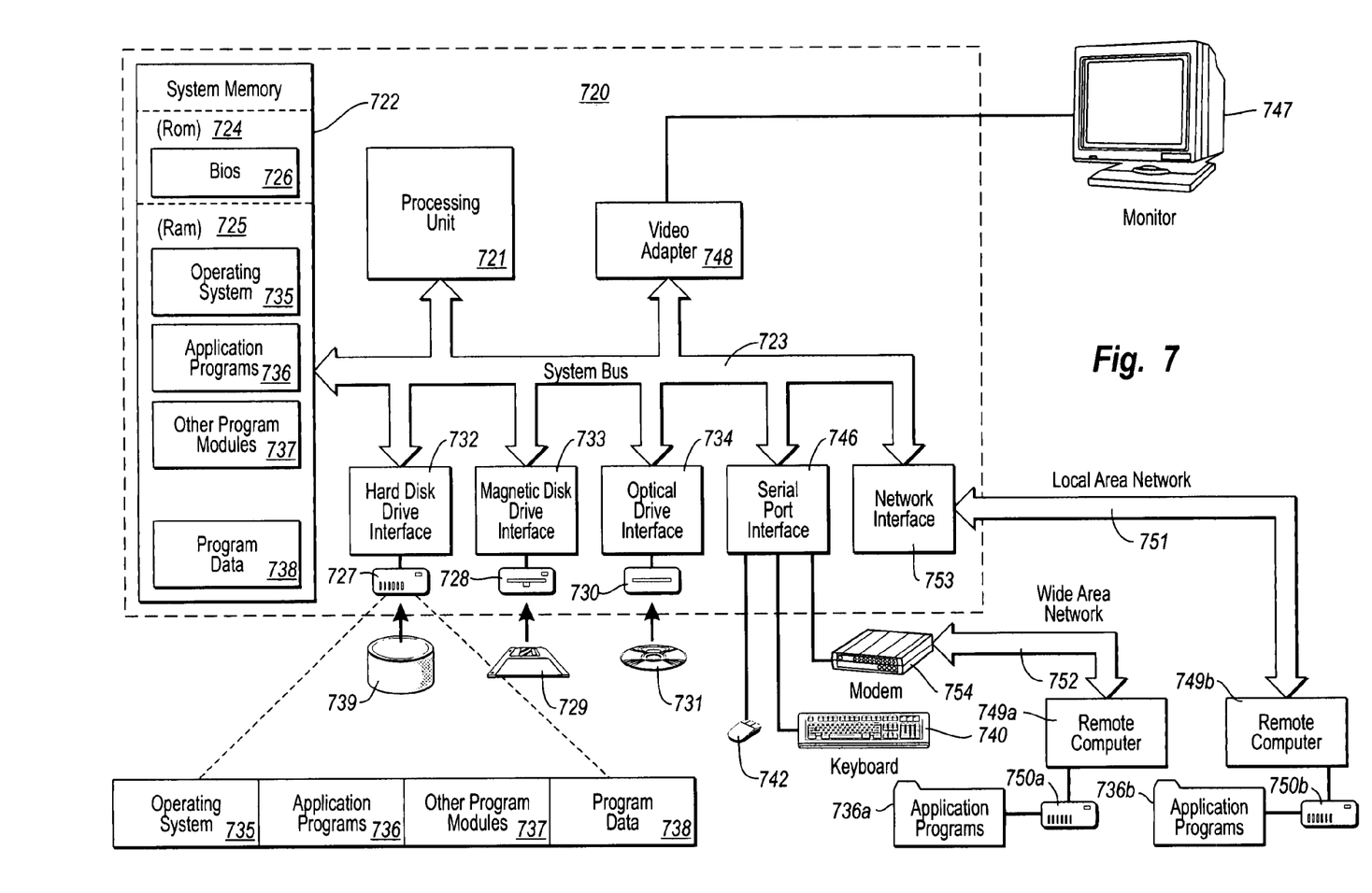
FIG. 7 illustrates an example system that provides a suitable operating environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 46 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system in a Web Services environment, a method of presenting a user with an easily understandable visual representation summarizing selected criteria of a yet to be generated Web Service policy by utilizing a wizard type tool, which abstracts the user from code used to satisfy the policy, the method comprising acts of:

presenting a set of Web Service policy options to a user at a user interface, which abstracts the user from any specific code that will be generated for a policy document that satisfies one or more of the set of Web Service policy options;

receiving user input selecting desired criteria from the set of Web Service policy options;

after receiving the user input, and based thereon, generating a graphical model including one or more keywords or symbols representing all of the desired criteria for the policy document;

after receiving all the user input selecting desired criteria, presenting the graphical model representing all of the desired criteria to the user at the user interface for providing a visual recap of the policy document that is yet to be generated;

generating the policy document after presenting to the user the graphical model representing all of the desired criteria selected by the user;

receiving user input modifying the desired criteria; and generating a new graphical model in response to receiving the user input modifying the desired criteria.

2. The method of claim 1, wherein the graphical model includes a visual tree like structure for showing relationships between a plurality of the desired criteria.

3. The method of claim 1, wherein a plurality of set of Web Service options are presented to the user through a plurality of pages in the wizard type tool, and wherein the user selects a plurality of desired criteria from the plurality of set of Web Service options and the graphical model is presented to the user after each selection of the plurality of desired criteria.

4. The method of claim 1, wherein the graphical model also includes a visual representation of one or more security rules that are automatically selected based on the user's selection of the desired criteria.

5. At a computer system in a Web Services environment, a computer program product for implementing a method of presenting a user with an easily understandable visual representation summarizing selected criteria of a yet to be generated Web Service policy by utilizing a wizard type tool, which abstracts the user from code used to satisfy the policy, the computer program product comprising one or more computer readable storage media having stored thereon computer executable instructions that, when executed by a processor, can cause the computer system to perform the following:

present a set of multiple Web Service policy options to a user at a user interface, which abstracts the user from any specific code that will be generated for a policy document that satisfies one or more of the set of Web Service policy options;

receive user input selecting multiple desired criteria from the set of Web Service policy options;

after receipt of user input selecting a first desired criteria, and based thereon, generate a graphical model including one or more keywords or symbols representing the first desired criteria after receipt of the user input selecting the first desired criteria for the policy document, present the graphical model representing the first desired criteria for the policy to the user at the user interface for providing a visual recap of the policy document, which policy document is yet to be generated;

after receipt of user input selecting a second desired criteria, and based thereon, modify the graphical model to include one or more keywords or symbols representing the first and second desired criteria; and after receipt of all the user input selecting desired criteria for the policy document, present the graphical model representing all of the desired criteria for the policy document to the user at the user interface for providing a visual recap of the policy document that is yet to be generated, and wherein modification of the graphical model, and display of the modified graphical model, is subsequently performed following selection of each desired criteria to display a summary of all selected desired criteria in a single visual recap, and before generation of the policy document.

6. The computer program product of claim 5, wherein the graphical model includes a visual tree like structure for showing relationships between a plurality of the desired criteria.

7. The computer program product of claim 5, wherein:

a new graphical model is generated each time the user modifies the desired criteria; and new graphical models are displayed to the user with all selected desired criteria each time the user modifies the desired criteria, and prior to generating the policy document.

8. The computer program product of claim 5, wherein the computer executable instructions, when executed by a processor, can further cause the messaging system to:

generate the policy document after presenting to the user the graphical model representing all of the desired criteria selected by the user.

9. The computer program product of claim 5, wherein the policy document generated is in an extensible markup language format.

10. The computer program product of claim 5, wherein a plurality of set of Web Service options are presented to the user through a plurality of pages in the wizard type tool, and wherein the user selects a plurality of desired criteria from the plurality of set of Web Service options and the graphical model is presented to the user after each selection of the plurality of desired criteria.

11. The computer program product of claim 5, wherein the graphical model also includes a visual representation of one or more security rules that are automatically selected based on the user's selection of the desired criteria.

12. The computer program product of claim 5, wherein the desired criteria are security criteria and the policy document is a security policy document in extensible markup language format.

* * * * *